United States Patent
Ofir et al.

(10) Patent No.: US 12,273,269 B1
(45) Date of Patent: Apr. 8, 2025

(54) SELECTIVE MESH ROUTING THROUGH NON-ADJACENT NODES

(71) Applicant: Marvell Asia Pte Ltd, Singapore (SG)

(72) Inventors: Nir Ofir, Yuvalim (IL); Robert Michael Bunce, Cary, NC (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/299,397

(22) Filed: Apr. 12, 2023

Related U.S. Application Data

(60) Provisional application No. 63/423,800, filed on Nov. 8, 2022.

(51) Int. Cl.
*H04L 45/74* (2022.01)
*H04L 45/42* (2022.01)

(52) U.S. Cl.
CPC .............. *H04L 45/74* (2013.01); *H04L 45/42* (2013.01)

(58) Field of Classification Search
CPC ................................ H04L 45/74; H04L 45/42
See application file for complete search history.

(56) References Cited

U.S. PATENT DOCUMENTS

| | | | |
|---|---|---|---|
| 5,920,699 A * | 7/1999 | Bare .................. | H04L 12/4604 709/225 |
| 7,143,219 B1 | 11/2006 | Chaudhari et al. | |
| 7,739,436 B2 | 6/2010 | Meyer | |
| 8,467,213 B1 * | 6/2013 | Channabasappa ..... | G11C 15/00 365/49.1 |
| 9,569,369 B2 * | 2/2017 | Sedlar ................. | G06F 12/0292 |
| 10,141,034 B1 * | 11/2018 | Zitlaw ................. | G06F 11/3055 |
| 10,824,505 B1 * | 11/2020 | Swarbrick ........... | G06F 11/1048 |
| 10,936,486 B1 * | 3/2021 | Swarbrick ........... | G06F 12/0284 |
| 11,769,832 B2 * | 9/2023 | Han ..................... | H10D 30/711 257/348 |
| 11,923,995 B2 * | 3/2024 | Raleigh .............. | H04W 12/088 |
| 2003/0028713 A1 | 2/2003 | Khanna et al. | |
| 2009/0245257 A1 * | 10/2009 | Comparan ............ | H04L 45/60 370/392 |

(Continued)

OTHER PUBLICATIONS

Fusella, et al., "Understanding Turn Models for Adaptive Routing: the Modular Approach," Design, Automation and Test in Europe (2018) 1489-1492.

(Continued)

*Primary Examiner* — Dhairya A Patel
(74) *Attorney, Agent, or Firm* — Hamilton, Brook, Smith & Reynolds, P.C.

(57) ABSTRACT

A memory array circuit routes packet data to a destination within the array. The memory array includes memory devices arranged in a plurality of rows and columns, as well as passthrough channels connecting non-adjacent memory devices. Each of the memory devices includes a memory configured to store packet data, and a packet router configured to interface with at least one adjacent memory device of the memory array. The packet router determines a destination address for a packet, and, based on the destination address, selectively forwards the packet to a non-adjacent memory device via a passthrough channel of the plurality of passthrough channels. A memory interface routes the packet from a source to the memory array, and selectively forwarding the packet to one of the plurality of memory devices based on the destination address.

20 Claims, 9 Drawing Sheets

(56) References Cited

U.S. PATENT DOCUMENTS

| | | | | |
|---|---|---|---|---|
| 2009/0316700 A1* | 12/2009 | White | | H04L 45/54 |
| | | | | 370/392 |
| 2010/0013517 A1 | 1/2010 | Manohar et al. | | |
| 2012/0215976 A1* | 8/2012 | Inoue | | G11C 15/04 |
| | | | | 711/108 |
| 2013/0121178 A1* | 5/2013 | Mainaud | | H04L 43/08 |
| | | | | 370/252 |
| 2013/0329546 A1* | 12/2013 | Wijnands | | H04L 12/1863 |
| | | | | 370/244 |
| 2014/0215185 A1 | 7/2014 | Danielsen | | |
| 2014/0226634 A1* | 8/2014 | Voigt | | H04L 67/568 |
| | | | | 370/335 |
| 2015/0006776 A1 | 1/2015 | Liu et al. | | |
| 2015/0188847 A1* | 7/2015 | Chopra | | H04L 45/306 |
| | | | | 370/401 |
| 2015/0205530 A1 | 7/2015 | Eilert et al. | | |
| 2017/0193136 A1* | 7/2017 | Prasad | | G06F 30/327 |
| 2017/0195295 A1* | 7/2017 | Tatlicioglu | | H04L 63/0414 |
| 2018/0301201 A1* | 10/2018 | Kantipudi | | G11C 29/52 |
| 2020/0026684 A1 | 1/2020 | Swarbrick | | H04L 49/109 |
| 2021/0385164 A1* | 12/2021 | Parmar | | H04L 45/42 |
| 2022/0150044 A1* | 5/2022 | Xiang | | G06N 10/70 |
| 2023/0315898 A1* | 10/2023 | Alaeddini | | H04L 63/105 |
| | | | | 726/28 |
| 2023/0316334 A1* | 10/2023 | Vankayala | | G06Q 30/0269 |
| | | | | 705/14.66 |
| 2024/0048508 A1 | 2/2024 | Viego et al. | | |

OTHER PUBLICATIONS

Glass, et al., "The Turn Model for Adaptive Routing," Advanced Computer Systems Laboratory, 1992, 278-287.

Khan, et al., "Design of a Round Robin Arbiter On Resource Sharing," Proceedings of 8th IRF International Conference, May 4, 2014, Pune, India.

Lee, et al., "Probabilistic Distance-based Arbitration: Providing Equality of Service for Many-core CMPs," 2010 43rd Annual IEEE/ACM International Symposium on Microarchitecture, pp. 509-519.

Mandal, et al., "Theoretical Analysis and Evaluation of NoCs with Weighted Round-Robin Arbitration," Dept. of ECE, University of Wisconsin-Madison, Aug. 21, 2021.

Merchant, "The Design and Performance Analysis of an Arbiter for a Multi-Processor Shared-Memory System," Aug. 1984, Laboratory for Information and Decision Systems, Massachusetts Institute of Technology, Cambridge, Massachusetts 02139.

Next Hop Definition, Created Nov. 17, 2005, Retrieved from the Internet at http://www.linfo.org/next_hop.html on Sep. 15, 2022, The Linux Information Project.

Wikipedia, "Mesh Interconnect Architecture—Intel," Retrieved from the Internet on Nov. 23, 2022 at https://en.wikipedia.org/wiki/Turn_restriction_routing.

Wikipedia, "Turn restriction routing," Retrieved from the Internet on Nov. 23, 2022 at https://en.wikichip.org/wiki/Intel/mesh_interconnect_architecture.

* cited by examiner

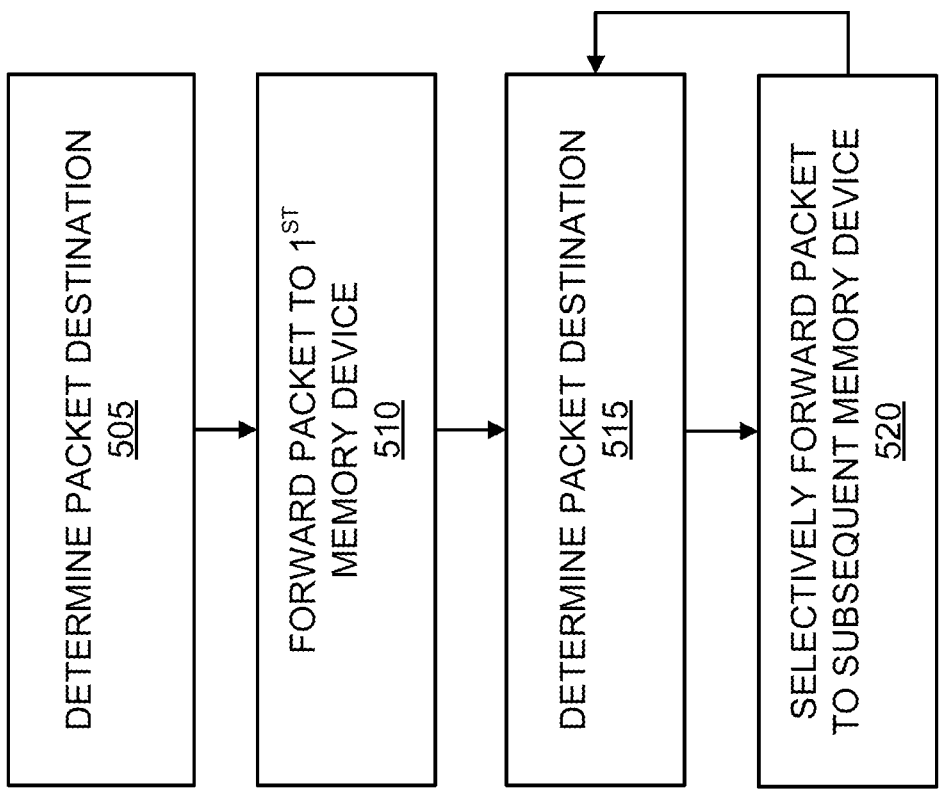

SELECTIVE MESH ROUTING THROUGH NON-ADJACENT NODES

RELATED APPLICATION

This application claims the benefit of U.S. Provisional Application No. 63/423,800, filed on Nov. 8, 2022. The entire teachings of the above application are incorporated herein by reference.

BACKGROUND

Shared memory subsystems are implemented in a variety of networking and other computing applications. In such a configuration, several initiators may have access to a common memory. To serve a large number of initiators, the shared memory can have a substantial size (e.g., over 10 megabytes (MB)).

SUMMARY

Example embodiments include a memory array circuit configured to route packet data through the array. A memory array may have a plurality of memory devices (also referred to as memory structures) arranged in a plurality of rows and columns and an interconnect for routing packets to the devices via a plurality of passthrough channels connecting non-adjacent memory devices. Each of the memory devices may include a memory configured to store packet data, and a packet router configured to interface with at least one non-adjacent memory device of the memory array. The packet router may be configured to: 1) determine a routing direction for a packet, and 2) based on the routing direction, selectively forward the packet to the non-adjacent memory device via a passthrough channel of the plurality of passthrough channels. A memory interface may be configured to route the packet from a source to the memory array, the memory interface selectively forwarding the packet to one of the plurality of memory devices based on the destination address.

The packet router may be further configured to forward the packet to the memory in response to determining a match between the memory device and the destination address. The plurality of passthrough channels may be integral to the plurality of memory devices, and may connect memory devices separated by a single memory device of the memory array. The memory interface may be further configured to 1) identify the destination address based on a packet header of the packet, the destination address indicating one of the plurality of memory devices, and 2) append the destination address to the packet prior to forwarding the packet to the memory array. The appended destination address may include a target identifier (ID) that indicates XY coordinates within the memory array for the one of the plurality of memory devices.

The memory interface may be configured to selectively forward the packet to one of a subset of the memory devices, the subset including 1) two adjacent memory devices in a first column, and 2) two non-adjacent memory devices in a second column distinct from the first column. Each of the plurality of passthrough channels may connect memory devices separated by multiple memory devices. The circuit may further include a plurality of memory interfaces including the memory interface, each of the plurality of memory interfaces configured to route the packet from one or more respective sources to one of a subset of the memory devices coupled to the memory interface.

The packet router may be further configured to select the non-adjacent memory device for forwarding the packet based on a history of at least one memory device to which the packet router forwarded a previous packet. The packet router may select the non-adjacent memory device for forwarding the packet based on a location of the memory interface relative to the memory array. The packet router may select the non-adjacent memory device for forwarding the packet based on a command or other signal issued by the memory interface.

Further embodiments include a method of routing packet data. At a memory device of a memory array having a plurality of memory devices arranged in a plurality of rows and columns and a plurality of passthrough channels connecting non-adjacent memory devices, 1) a destination address for a packet may be determined; and 2) based on the destination address, the packet may be selectively forwarded to a non-adjacent memory device via a passthrough channel of the plurality of passthrough channels. At a memory interface, the packet may be selectively forwarded to one of the plurality of memory devices based on the destination address.

Further embodiments include a node array circuit configured to route packet data through the array. A node array may have a plurality of node devices arranged in a plurality of rows and columns and a plurality of passthrough channels connecting non-adjacent node devices. Each of the node devices may include a node configured to store packet data, and a packet router configured to interface with at least one non-adjacent node device of the node array. The packet router may be configured to: 1) determine a destination address for a packet, and 2) based on the destination address, selectively forward the packet to the non-adjacent node device via a passthrough channel of the plurality of passthrough channels. A node interface may be configured to route the packet from a source to the node array, the node interface selectively forwarding the packet to one of the plurality of node devices based on the destination address.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 5 is a flow diagram of a method of routing a request in one embodiment.

DETAILED DESCRIPTION

A description of example embodiments follows.

Figure 1:
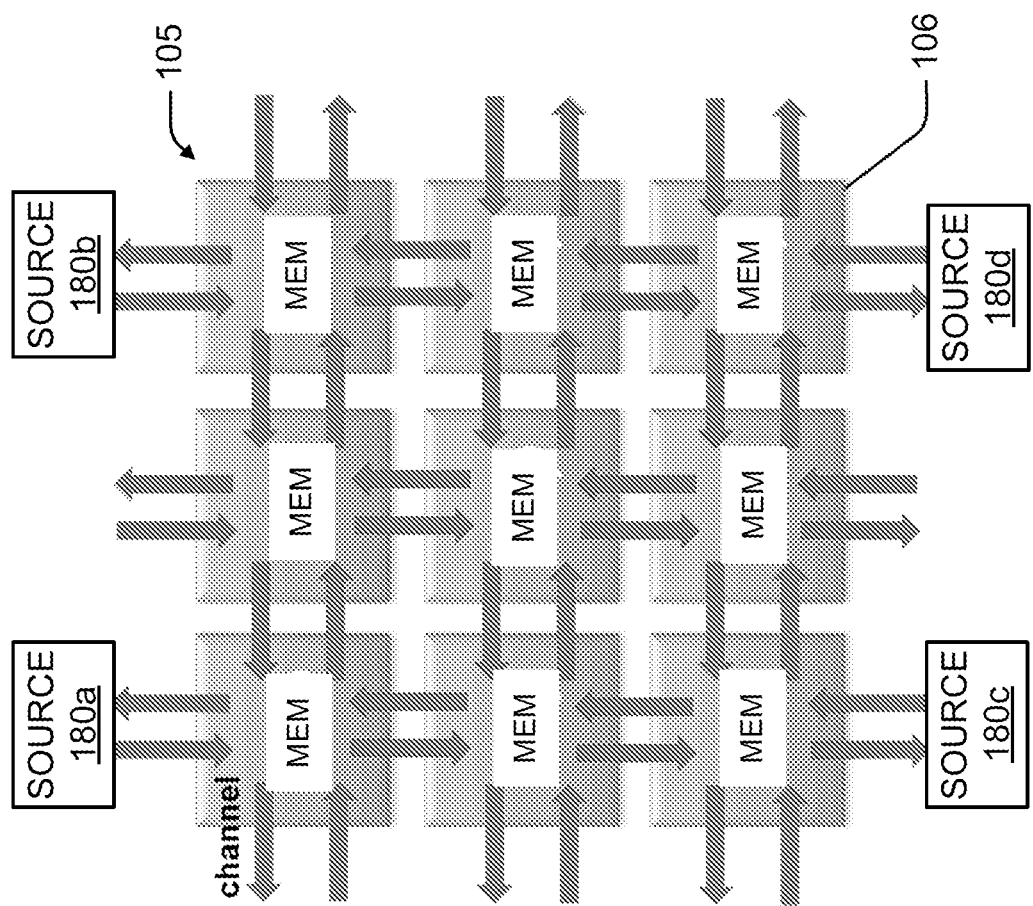
FIG. 1 is a block diagram of a prior art shared memory subsystem.

FIG. 1 is a block diagram of a prior art shared memory subsystem 100. Typical shared memory subsystems are implemented in a variety of networking and other computing applications. In such a configuration, several sources 180*a-d*, such as processors, may have access to a common, shared memory array 105. As shown, the memory array 105 exhibits a "mesh" structure, which comprises several memory devices (e.g., device 106) arranged in a grid pattern and each connected with neighboring memory devices. A "mesh" may be understood as a structure divides a space into a matrix of nodes, and the interconnects between the nodes move data from one node to another based on a routing algorithm. Thus, a given source 180*a* may access, store, and retrieve data at any one of the devices of the array 105, and each of the devices may route the data along a path through the array between the source 180*a* and a target device.

A transfer of data between two devices of the array 105 may be referred to as a "hop," and each hop may involve the transfer of data of any size between the devices. For example, a data transfer may be a parallel transmission of several bytes (e.g., 16, 32, or 64 bytes) of data between the devices. Such transfers occur both for requests from a source 180*a* and for a response from a target device 106, and each access operation can involve several such transfers between adjacent devices. As represented by the arrows within the array 105, each device 106 may include several channels for such transfers, including channels for 2-way communications with each adjacent device. The bandwidth of the array 105 for such transfers, therefore, is a function of the bandwidth of these inter-device channels. Further, the latency of a transfer operation is defined by two variables: 1) the number of "hops" (devices traversed) for the data to reach its target (e.g., device 106 or source 108*a*), and 2) the time taken by each device in the path of the transfer operation to forward the data the next device in the path.

Example embodiments, described below, provide a mesh circuit that optimizes the routing of data between external sources and destinations internal to the array. As a result, such embodiments significantly reduce the latency exhibited by data transfer operations within the mesh circuit, thereby reducing the number of pending operations (e.g., outstanding requests) and thus the logic required to manage pending operations, saving power and reducing the circuit's needed area. Such embodiments also as minimize data traffic congestion within the circuit due to faster routing of data, thereby allowing a reduction in the size of buffers (e.g., first in, first out (FIFO) buffers) used to queue data and requests at each device. Although example embodiments below include memory subsystems, further embodiments may be implemented as any other subsystem comprising a mesh network of nodes, such as a distributed processing system comprising an array of processors and/or other devices.

Figure 2A:
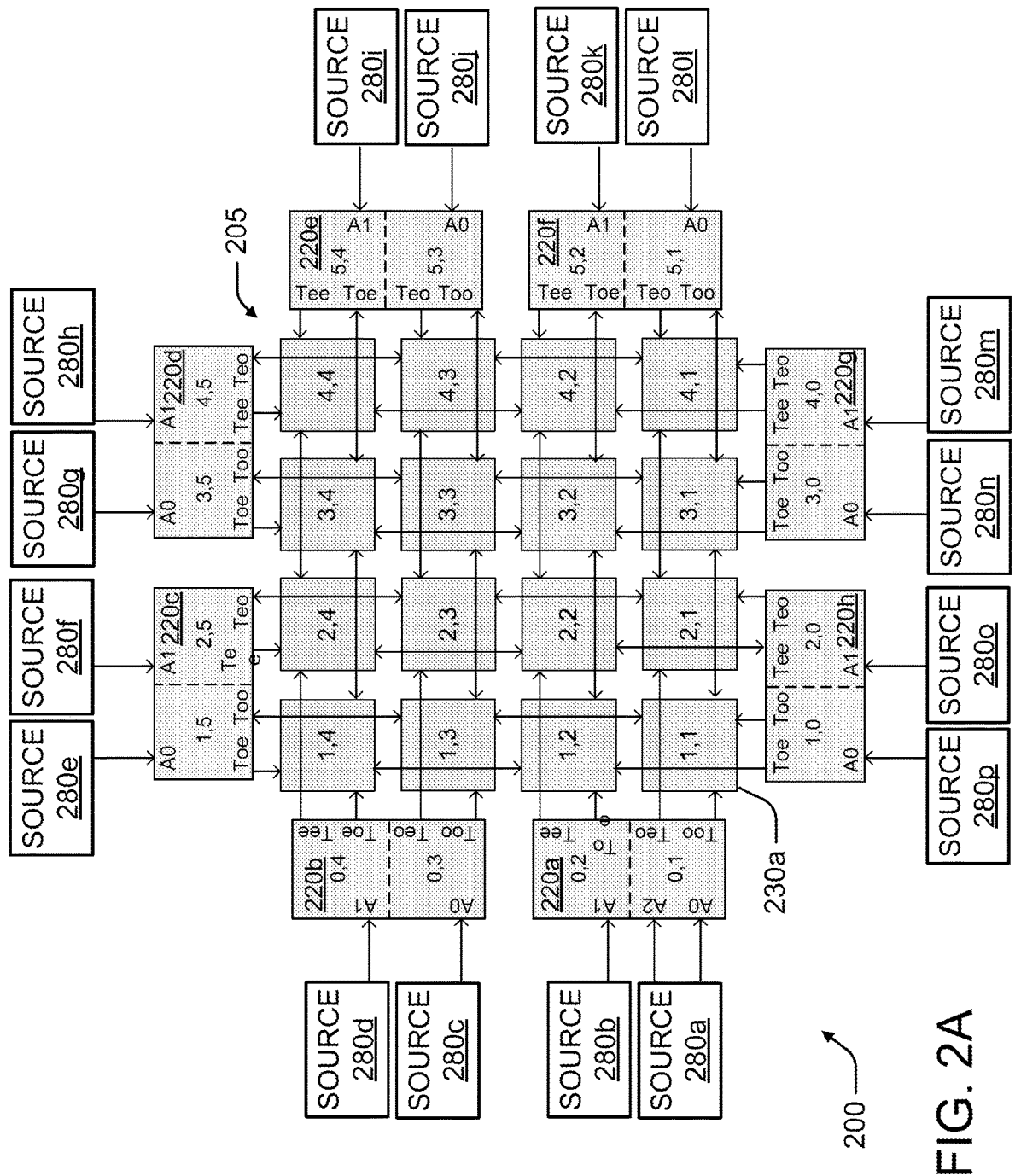
FIGS. 2A-C are block diagrams of a circuit in one embodiment.
Figure 2B:
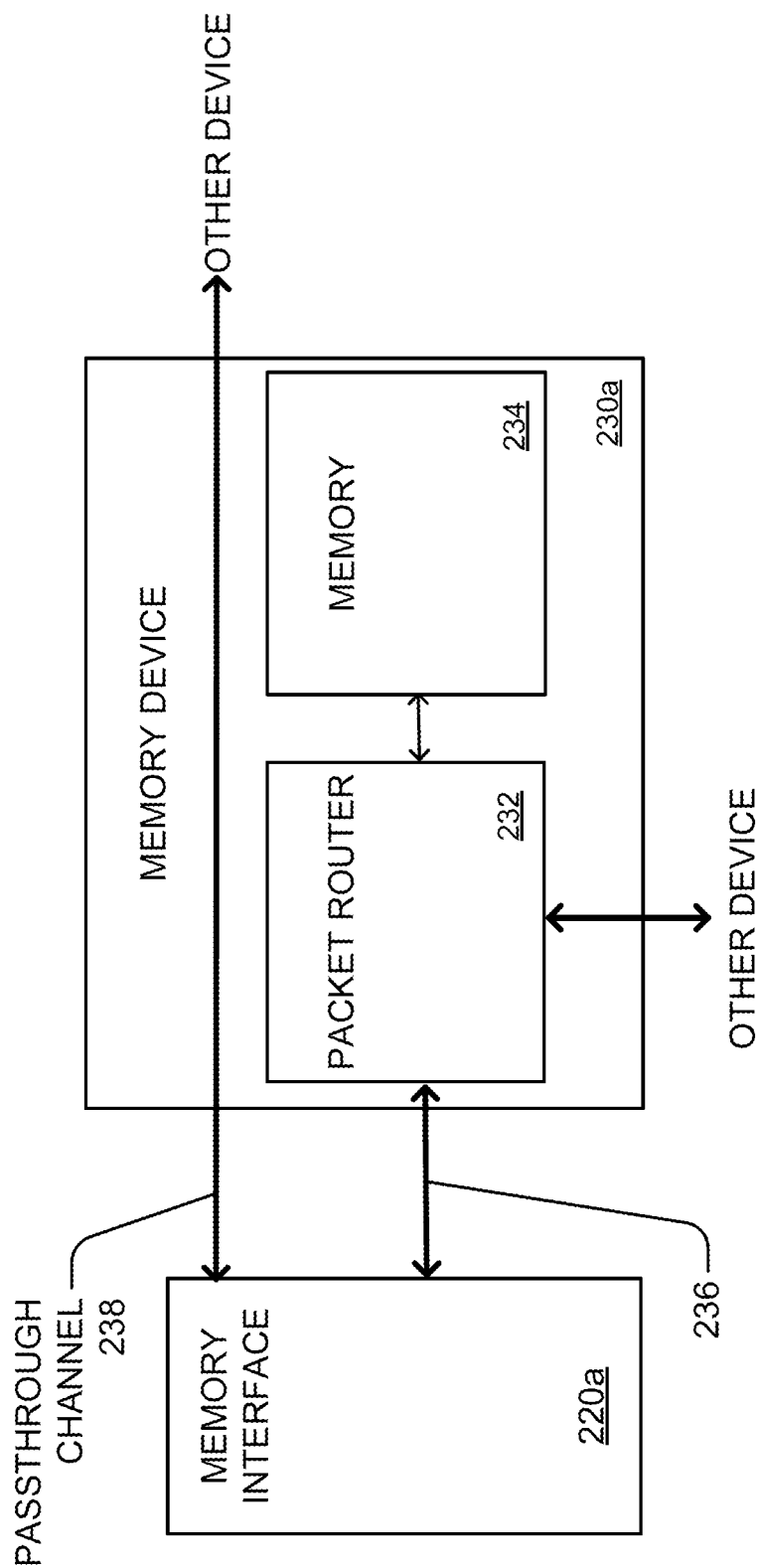
Figure 2C:
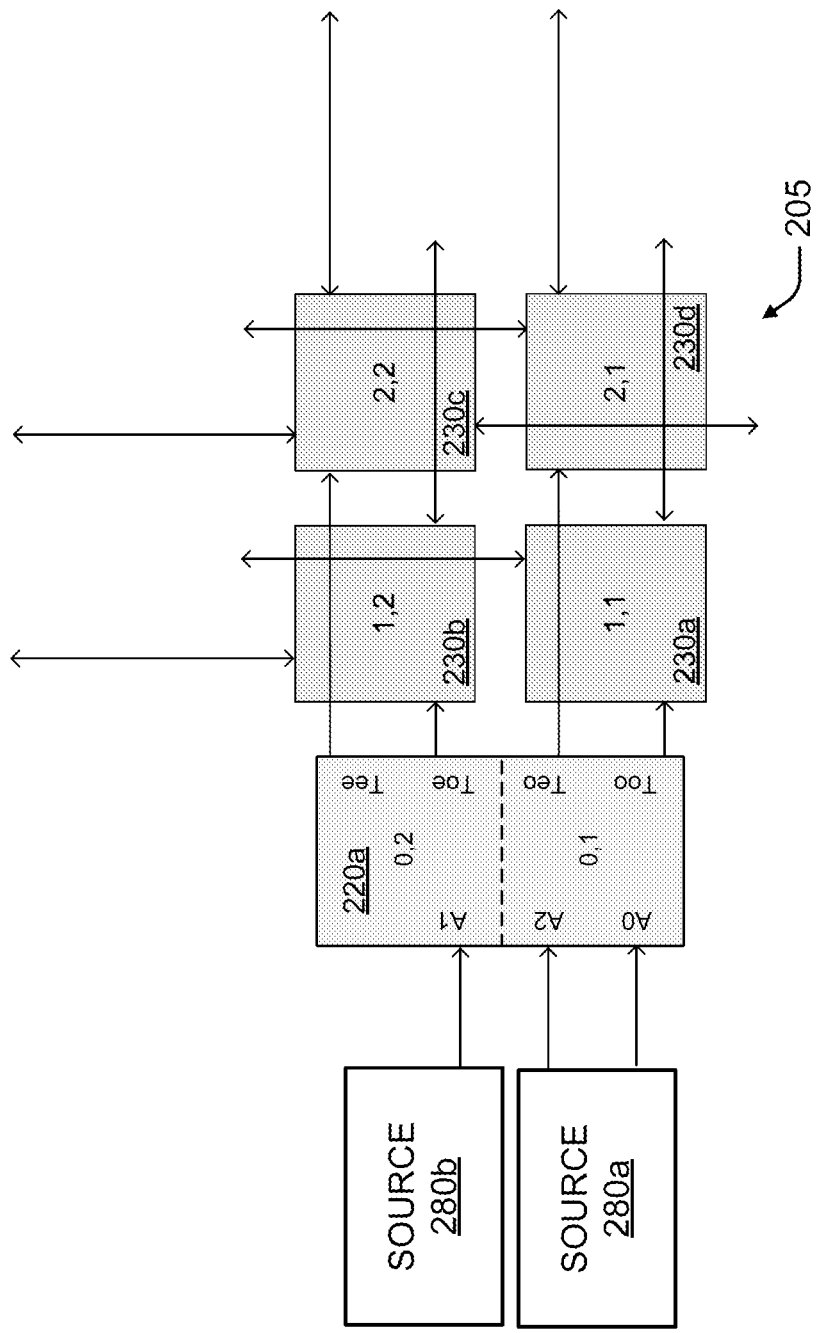

FIGS. 2A-C are block diagrams of a shared memory subsystem 200 in one embodiment. As shown in FIG. 2A, the subsystem 200 includes an array 205 of memory devices, including device 230*a*, arranged in a grid structure. Several memory interfaces 220*a-h* are communicatively coupled to the array 205 and operate as an interface between sources 280*a-p* (e.g., processors requesting memory access) and the array 205. Each of the memory interfaces 220*a-h* may be coupled to a subset of the devices of the array 205 via adjacent and passthrough channels as indicated by respective arrows, which make up an interconnect linking the devices of the array 205. The system 200 may operate to provide memory access, storage and retrieval for the sources 280*a-p* by distributing data among the memory devices of the array 205.

FIG. 2B illustrates a memory device 230*a* of the array 205 in further detail. As shown, the memory device 230*a* may include a packet router 232 and a memory 234. The packet router 232 may communicate with the memory interface 220*a* via an adjacent channel 236 for communications related to memory access operations. For example, the memory interface 220*a* may forward a data packet to the packet router 232 via the adjacent channel 236. The packet router 232 may parse the data packet to determine whether the data packet is addressed to the memory device 230*a*. If so, then the packet router may access its local memory 234 to execute a corresponding memory access operation. Otherwise, the packet router 232 may forward the packet to another memory device toward its destination, as described in further detail below. Further, a passthrough channel 238 may extend from the memory interface 220*a*, through or around the memory device 230*a*, terminating at another memory device, thereby enabling the memory interface to communicate with the other memory device. The passthrough channel 238 may be integral to the device 230*a* (e.g., a wire extending through the device), or may extend above, below, or around the perimeter of the device 230*a*. Although the passthrough channels shown in FIG. 2A traverse a single device, further embodiments may implement passthrough channels that traverse two or more devices.

FIG. 2C illustrates a subset of the system 200 in further detail. Here, a selection of four memory devices of the array 205, devices 230*a-d*, are shown, as well as a single memory interface 220*a* that services two sources 280*a-b*. The memory interface 220*a* is directly connected to the four devices 230*a-d*, either via an adjacent channel (devices 230*a-b*) or a passthrough channel (devices 230*c-d*) as shown by the arrows representing the channels. Thus, in response to receiving a data packet or other communication from a source 280*a-b*, the memory interface 220*a* may selectively forward the data packet to any one of the four memory devices 230*a-d*. The selection of the memory device to receive the packet may be based on the destination address of the packet as indicated by the packet or corresponding information, as described in further detail below.

Figure 3:
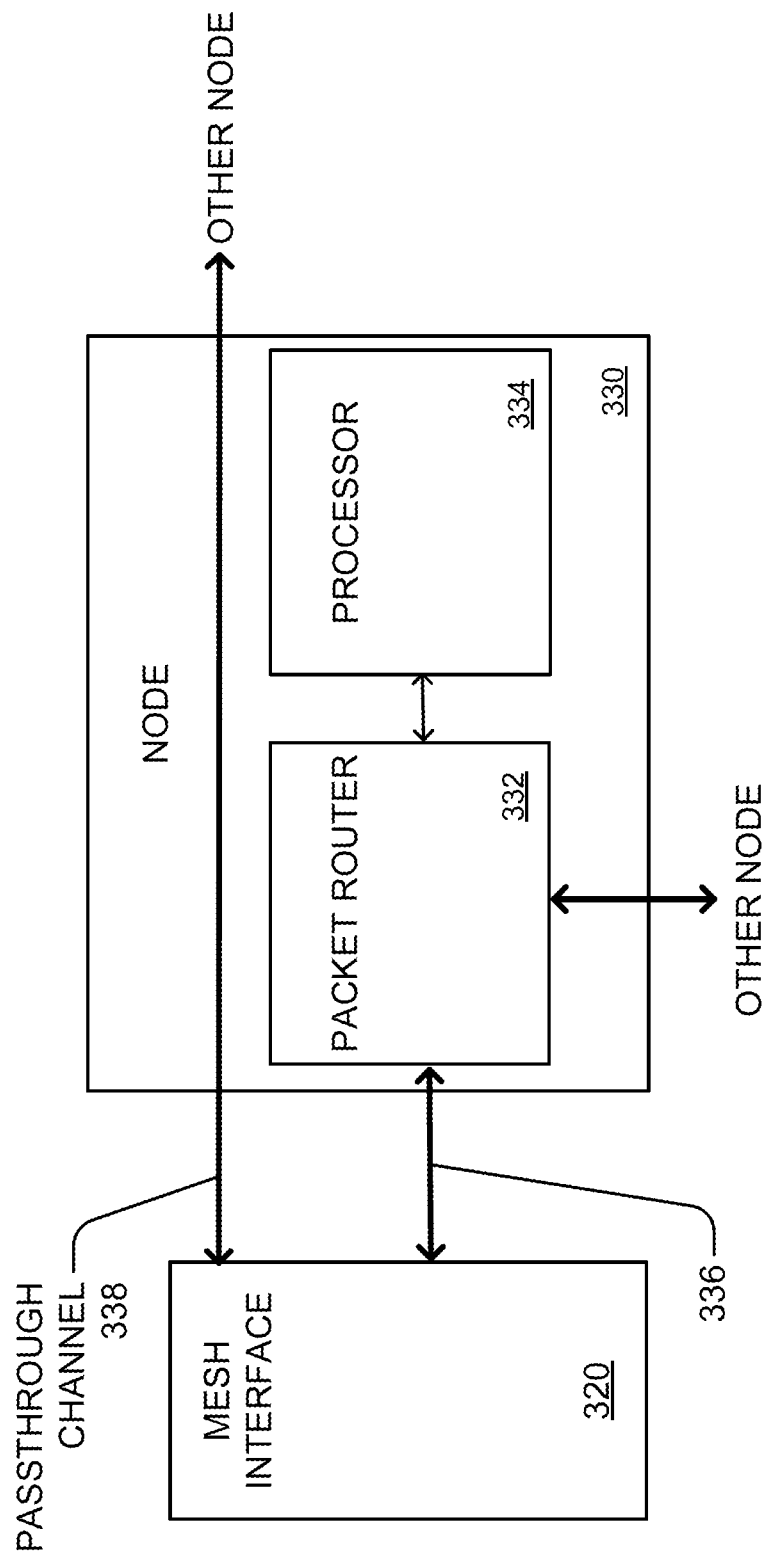
FIG. 3 is a block diagram of a node in a further embodiment.

FIG. 3 is a block diagram of a mesh interface 320 and a node 330 that may be implemented in place of a memory interface and one or more of the memory devices in the array described above. For example, as an alternative to a memory device, the array of FIG. 2A may be configured as a distributed processing mesh, which may include an array of processing units alone or in combination with other nodes, such as memory devices.

The mesh interface 320 and node 330 may be configured comparably to the memory interface 220*a* and memory device 230*a* described above. In particular, the node 330 may include a packet router 332 and a processor 334. The packet router 332 may communicate with the mesh interface 320 via an adjacent channel 336 for communications related to tasks for execution by the processor 334. For example, the memory interface 320 may forward a data packet (indicating, for example, a request to complete a processing task) to the packet router 332 via the adjacent channel 336. The packet router 332 may parse the data packet to determine whether the data packet is addressed to the node 33. If so, then the packet router 332 may access its processor 334 to execute a corresponding task. Otherwise, the packet router 332 may forward the packet to another node toward its destination, as described in further detail below. Further, a passthrough channel 338 may extend from the memory interface 220*a*, through or around the memory device 230*a*, terminating at another memory device, thereby enabling the mesh interface 320 to communicate with the other memory device. The passthrough channel 238 may be integral to the device 330 (e.g., a wire extending through the device), or may extend above, below, or around the perimeter of the device 330.

Figure 4A:
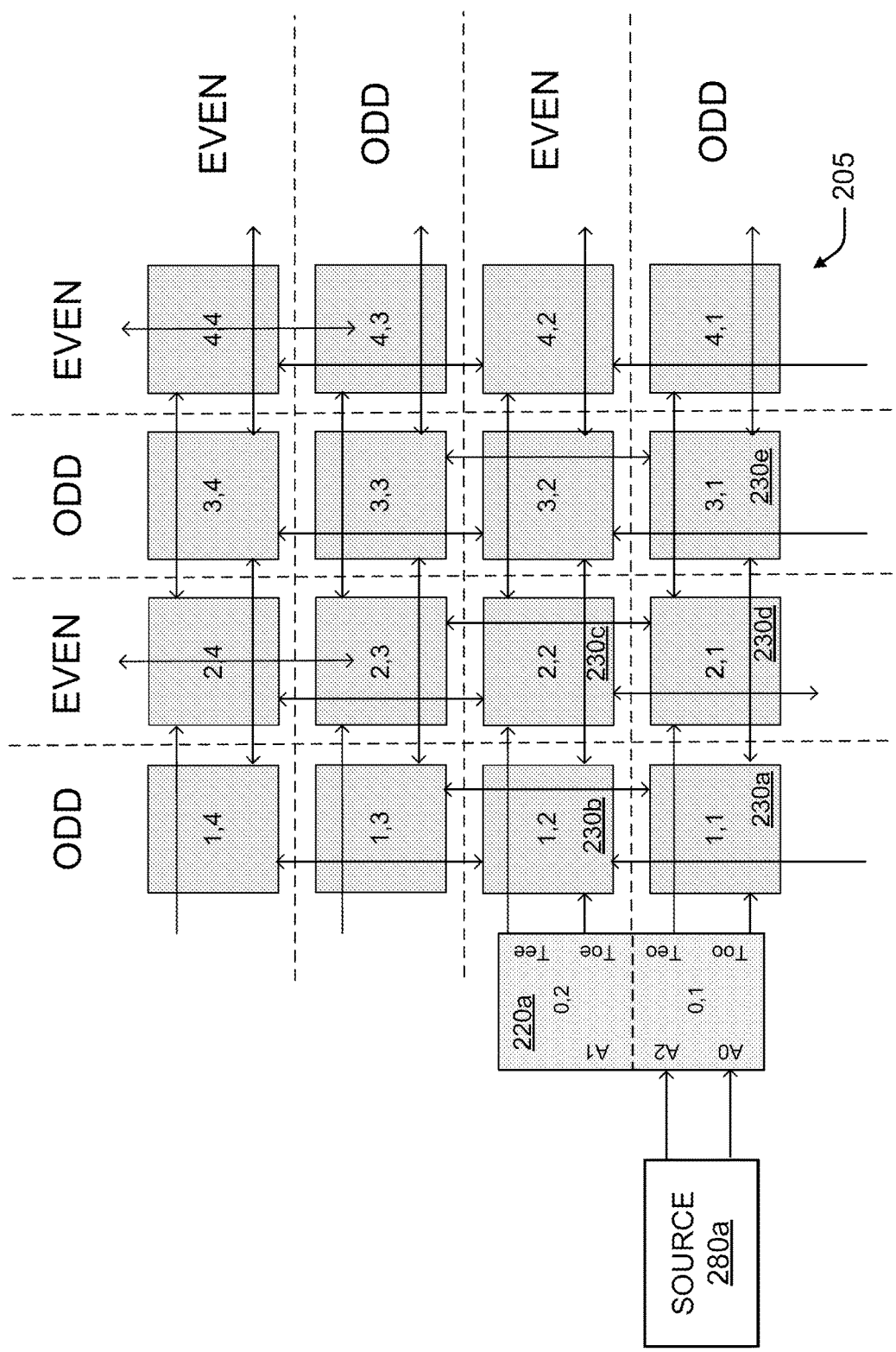
FIGS. 4A-C are diagrams of the circuit in a routing operation in one embodiment.
Figure 4B:
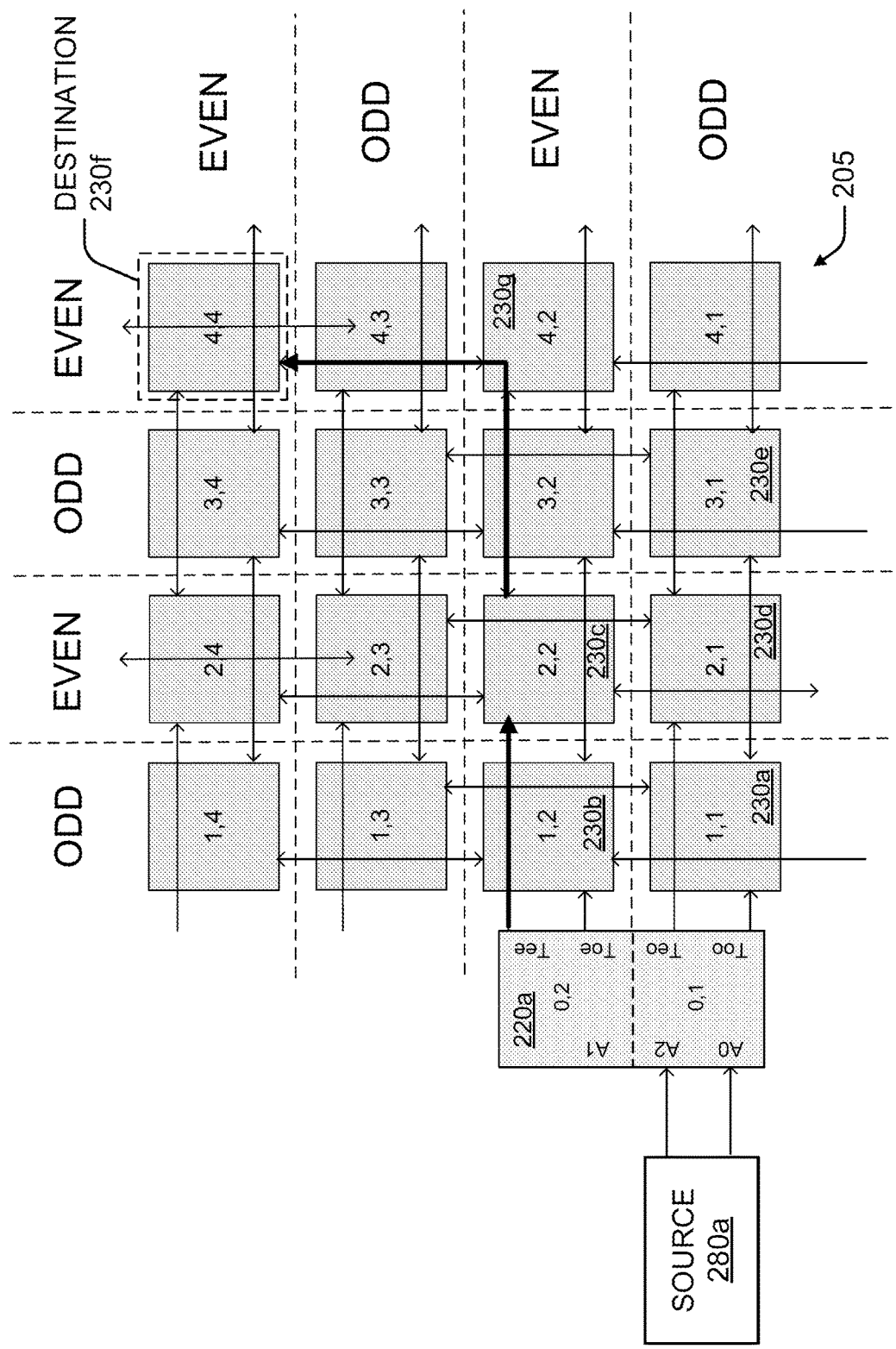
Figure 4C:
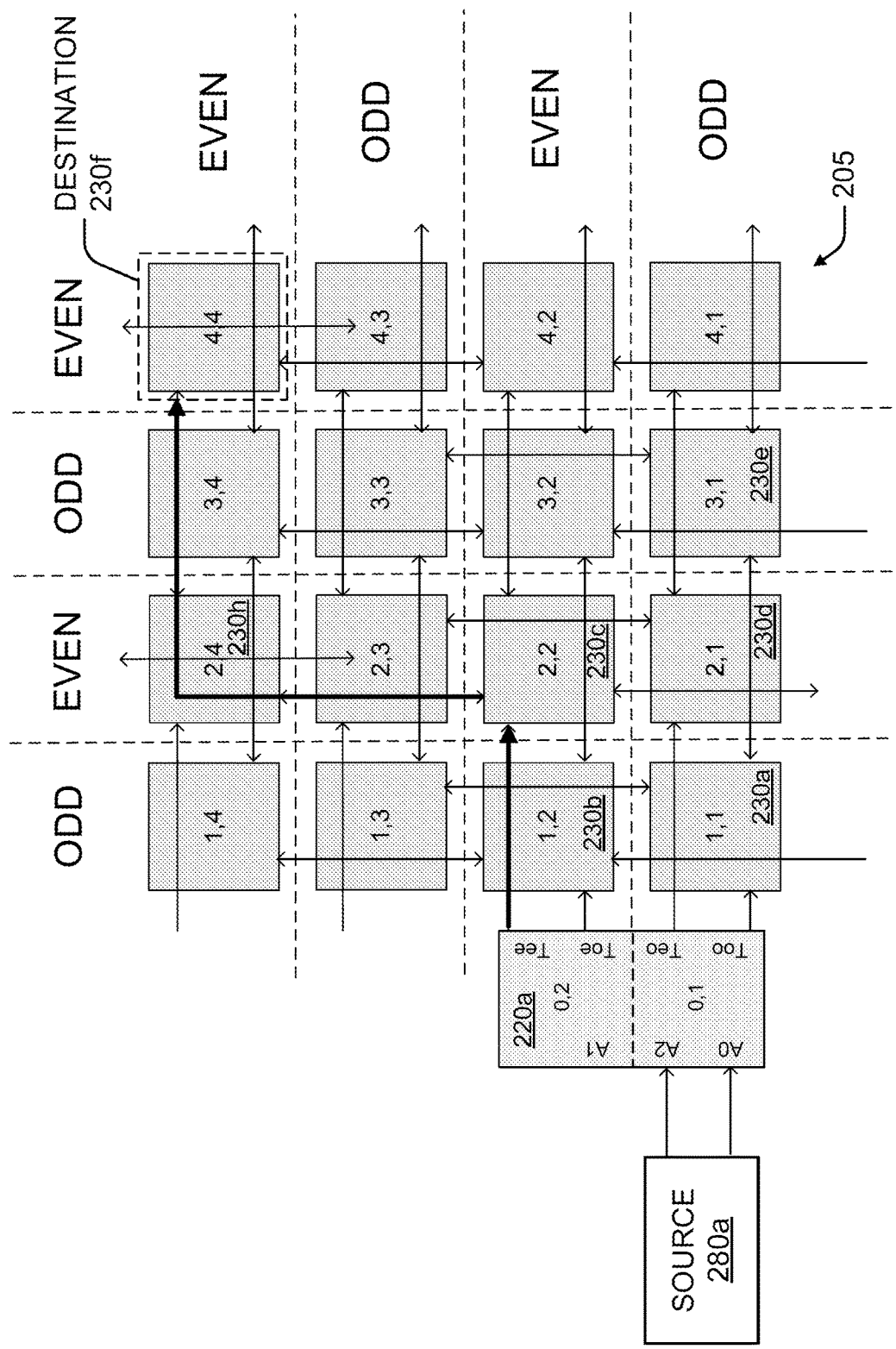

FIGS. 4A-C illustrate the memory subsystem 200 in further detail. As shown in FIG. 4A, the array 205 can be divided into a number of rows and columns, each designated as either an "odd" row/column or an "even" row/column. Thus, each device of the array may belong to one of four groups of devices based on its row and column. For example, device 230c is a member of the group of devices located in an "even" row and an "even" column, while device 230d is a member of the group of devices located in an "odd" row and an "even" column. As demonstrated in FIG. 2C, the memory interface 220a has direct access to four devices 220a-d, and each of those devices 220a-d belongs do a different one of the aforementioned groups. Thus, the memory interface 220a has direct access to a device belonging to every combination of even and odd rows and columns. The remaining memory interfaces 220b-h (FIG. 2A) may be configured in a similar manner to a corresponding subset of the array 205.

Further, as indicated by the arrows representing adjacent and passthrough channels, each of the devices 230a-d is coupled to at least one other device of the same group via a passthrough channel. For example, device 230a is connected to device 230e, a member of the same "odd row, odd column" ("odd/odd") group, via a passthrough channel. As a result, the memory interface 220a can access any device of the array 205 through one of the four devices 230a-d to which it is directly connected. In order to forward a data packet (e.g., request, data for processing/storage, command) from the source 280a to a target device addressed by the packet, the memory interface 220a may first forward the packet to one of the devices 230a-d belonging to the same group as the target device, which, in turn, may forward the packet along a path toward its destination. FIGS. 4B and 4C illustrate the subsystem 200 in the process of an example routing operation, and are described in further detail below with reference to FIG. 5.

FIG. 5 is a flow diagram of a process 500 of routing a packet in one embodiment. The process 500 may be carried out by any of the embodiments described above, and may be applied to the routing of any signal (e.g., data, command, request) through a mesh circuit. With reference to FIG. 4B, the memory interface 220a may receive a packet from the source 280a, the packet comprising data for storage at the array 205. The memory interface 220a may parse the packet (e.g., a packet header) to determine which of the devices of the array 205 to deliver the packet (505). This action may include translating an address of a packet header to an address or target identifier (ID) indicating the XY coordinates of the destination device within the array (e.g., via a lookup table or other address translation). In the example shown, device 230f is the destination, which corresponds to XY coordinates of 4, 4. Because the destination belongs to the "even/even" group, the memory interface 220a may determine the device 230c, which is also a member of the "even/even" group, to receive the packet, and forwards the packet accordingly (510). Optionally, the interface 220a may also forward an indication of the X, Y coordinates of the destination to the device 230c. It may do so, for example, by modifying the packet header of the packet to incorporate the target ID or coordinates (e.g., replacing or supplementing the initial address of the packet header), or by forwarding an accompanying signal with the packet.

Upon receipt of the packet at the device 230c, the packet router of the device 230c may determine the destination address for the packet (515). Depending on the information conveyed by the memory interface 220a, the packet router may do so by reading the XY coordinates provided by the memory interface 220a, or by performing an address translation comparable to that performed by the memory interface 220a. Based on the destination address, the device 230c selectively forward the packet to a non-adjacent memory device via a passthrough channel (520). As shown in FIG. 4B, this non-adjacent memory device may be device 230g. This device 230g, in turn, may perform operations comparable to those of the device 230c, thereby forwarding the packet to the destination device 230f.

As shown in FIG. 4C, an alternative path may be taken to deliver the packet to the device 230f, forwarding through device 230h rather than device 230g. The system 200 may select among the paths of FIGS. 4B and 4C in a number of ways, and such selection may be configured to optimize load balancing and/or traffic distribution among the nodes of the array 205. For example, each of the memory interfaces 220a-h may be configured to provide instructions with the packet indicating to the first node of the array 205 a direction in which to send the packet. The instruction may be based on the based on the location of the memory interface relative to the memory array 205. For example, interfaces aligned with a column of the array 205, such as the interface 220a, may instruct a horizontal initial move, while interfaces aligned with a row, such as interface 220c, may instruct a vertical initial move. Alternatively, the packet router of the device may select the non-adjacent memory device for forwarding the packet based on a history of previous packets forwarded by the packet router, for example enforcing alternating directions in which successive packets are sent. The memory interface 220a may also be configured to provide a command to the first device in the path to select a next device in a determined direction, maintaining a history of previous instructions to ensure a balance of traffic load along multiple paths through the array 205.

While example embodiments have been particularly shown and described, it will be understood by those skilled in the art that various changes in form and details may be made therein without departing from the scope of the embodiments encompassed by the appended claims.

What is claimed is:

1. A circuit, comprising:
 a memory array having a plurality of memory devices arranged in a plurality of rows and columns and a plurality of passthrough channels connecting non-adjacent memory devices, each of the memory devices including:
  a memory configured to store packet data, and
  a packet router configured to interface with at least one non-adjacent memory device of the memory array, the packet router configured to: 1) determine a destination address for a packet, and 2) based on the destination address, selectively forward the packet to a non-adjacent memory device via a passthrough channel of the plurality of passthrough channels, the passthrough channel being routed through an adjacent memory device located between the memory device and the non-adjacent memory device, the passthrough channel being communicatively decoupled from a memory and a packet router of the adjacent memory device; and
 a memory interface configured to route the packet from a source to the memory array, the memory interface selectively forwarding the packet to one of the plurality of memory devices based on the destination address;
 wherein the memory interface is further configured to append the destination address to the packet prior to forwarding the packet to the memory array, the appending including a target identifier (ID) indicating XY coordinates within the memory array for the one of the plurality of memory devices.

2. The circuit of claim 1, wherein the packet router is further configured to forward the packet to the memory in response to determining a match between the memory device and the destination address.

3. The circuit of claim 1, wherein the plurality of passthrough channels are integral to the plurality of memory devices.

4. The circuit of claim 1, wherein the plurality of passthrough channels connect memory devices separated by a single memory device of the memory array.

5. The circuit of claim 1, wherein the memory interface is further configured to identify the destination address based on a packet header of the packet, the destination address indicating one of the plurality of memory devices.

6. The circuit of claim 1, wherein the memory interface is configured to selectively forward the packet to one of a subset of the memory devices, the subset including 1) two adjacent memory devices in a first column, and 2) two non-adjacent memory devices in a second column distinct from the first column.

7. The circuit of claim 1, wherein each of the plurality of passthrough channels connect memory devices separated by multiple memory devices.

8. The circuit of claim 1, further comprising a plurality of memory interfaces including the memory interface, each of the plurality of memory interfaces configured to route the packet from one or more respective sources to one of a subset of the memory devices coupled to the memory interface.

9. The circuit of claim 1, wherein the packet router is further configured to select the non-adjacent memory device for forwarding the packet based on a history of at least one memory device to which the packet router forwarded a previous packet.

10. The circuit of claim 1, wherein the packet router is further configured to select the non-adjacent memory device for forwarding the packet based on a location of the memory interface relative to the memory array.

11. The circuit of claim 1, wherein the packet router is further configured to select the non-adjacent memory device for forwarding the packet based on a signal issued by the memory interface.

12. A method of routing packet data, comprising:
at a memory device of a memory array having a plurality of memory devices arranged in a plurality of rows and columns and a plurality of passthrough channels connecting non-adjacent memory devices:
determine a destination address for a packet; and
based on the destination address, selectively forward the packet to a non-adjacent memory device via a passthrough channel of the plurality of passthrough channels, the passthrough channel being routed through an adjacent memory device located between the memory device and the non-adjacent memory device, the passthrough channel being communicatively decoupled from a memory and a packet router of the adjacent memory device; and
at a memory interface, selectively forwarding the packet to one of the plurality of memory devices based on the destination address; and
at the memory interface, appending the destination address to the packet prior to forwarding the packet to the memory array, the appending including a target identifier (ID) indicating XY coordinates within the memory array for the one of the plurality of memory devices.

13. The method of claim 12, further comprising forwarding the packet to the memory in response to determining a match between the memory device and the destination address.

14. The method of claim 12, wherein the plurality of passthrough channels are integral to the plurality of memory devices.

15. The method of claim 12, wherein the plurality of passthrough channels connect memory devices separated by a single memory device of the memory array.

16. The method of claim 12, further comprising:
identifying the destination address based on a packet header of the packet, the destination address indicating one of the plurality of memory devices.

17. The method of claim 12, further comprising, at the memory interface, selectively forwarding the packet to one of a subset of the memory devices, the subset including 1) two adjacent memory devices in a first column, and 2) two non-adjacent memory devices in a second column distinct from the first column.

18. The method of claim 17, further comprising, at the memory device, selecting the non-adjacent memory device for forwarding the packet based on a location of the memory interface relative to the memory array.

19. A circuit, comprising:
a node array having a plurality of node devices arranged in a plurality of rows and columns and a plurality of passthrough channels connecting non-adjacent node devices, each of the node devices including:
a processor configured to process packet data, and
a packet router configured to interface with at least one non-adjacent node device of the node array, the packet router configured to: 1) determine a destination address for a packet, and 2) based on the destination address, selectively forward the packet to the non-adjacent node device via a passthrough channel of the plurality of passthrough channels, the passthrough channel being routed through an adjacent memory device located between the memory device and the non-adjacent memory device, the passthrough channel being communicatively decoupled from a memory and a packet router of the adjacent memory device; and
an interface configured to 1) append the destination address to the packet prior to forwarding the packet to the memory array, the appending including a target identifier (ID) indicating XY coordinates within the memory array for the one of the plurality of memory devices, and 2) route the packet from a source to the node array, the interface selectively forwarding the packet to one of the plurality of node devices based on the destination address.

20. A circuit, comprising:
at a memory device of a memory array having a plurality of memory devices arranged in a plurality of rows and columns and a plurality of passthrough channels connecting non-adjacent memory devices:
means for determining a destination address for a packet; and
means for selectively forwarding, based on the destination address, the packet to a non-adjacent memory device via a passthrough channel of the plurality of passthrough channels, the passthrough channel being routed through an adjacent memory device located between the memory device and the non-adjacent memory device, the passthrough channel being communicatively decoupled from a memory and a packet router of the adjacent memory device; and at a memory interface, means for 1) appending the destination address to the packet prior to forwarding the packet to the memory array, the appending including a target identifier (ID) indicating XY coordinates within the memory array for the one of the plurality of memory devices, and 2) selectively forwarding the packet to one of the plurality of memory devices based on the destination address.

* * * * *